Patented Dec. 18, 1951

2,579,430

UNITED STATES PATENT OFFICE 2,579,430

DORMANT PARASITICIDE COMPOSITIONS

Oscar H. Hammer, South Haven, Mich., assignor to The Dow Chemical Company, Midland, Mich., a corporation of Delaware No Drawing. Application June 11, 1949, Serial No. 98,623

3 Claims. (Cl. 167—30)

This invention relates to dormant parasiticide compositions and is particularly directed to compositions including the 4-chlorophenyl ester of 4-chlorobenzene sulfonic acid and the triethanolamine salt of 2,4-dinitro-6-secondarybutylphenol.

It has been discovered that the 4-chlorophenyl ester of 4-chlorobenzene sulfonic acid may be combined with the triethanolamine salt of 2,4-dinitro-6-secondarybutylphenol to obtain a dormant parasiticidal composition having very desirable properties for the control of plant parasites. In such mixture there appears to be no chemical reaction between the toxic constituents, and the toxicants are mutually activating so that a greater than additive effect is accomplished particularly as regards control of mite and spider mite organisms. A further advantage resides in the prolonged residual effect exerted by the mixture against mite eggs. Thus a single application of the mixture, compounded with a suitable liquid carrier in a spray composition, gives excellent control of such organisms as Bryobia praetiosa (clover mite) and Paratetranychus pilosus (European red mite) for periods ranging up to several months. The mixture appears particularly of value for the dormant treatment of apple, pear, peach, prune, and plum and other deciduous trees.

In operating in accordance with the present invention, the new toxicant mixtures may be employed with any suitable liquid carrier in the form of spray compositions. Also a mixture of the toxicants may be so compounded as to produce concentrates adapted subsequently to be diluted to form spray mixtures.

In the preparation of sprays, the 4'-chlorophenyl 4-chlorobenzene sulfonate and triethanolamine salt of 2,4-dinitro-6-secondarybutylphenol may be mixed together and the resulting mixture dispersed in water or other liquid carrier such as oil or oil-water emulsion. Alternatively, the toxicants may be separately dispersed in the water or other carrier. Another mode of operation comprises mixing the toxicants with bentonite, diatomaceous earth, or talc, and dispersing the resulting mixture in water. Any compatible wetting or dispersing agent may be employed in the spray compositions.

Where a concentrate is desired, the mixture of toxicants may be compounded with dispersing and wetting agents. Alternatively, the toxicants may be separately compounded in concentrate form and mixed together upon dilution in the ultimate spray composition.

Wetting and dispersing agents adapted to be employed in the various compositions as suggested above include sodium lauryl sulfate, alkyl aryl sulfonate (Nacconol NR), alkyl aryl sulfonate (Orinite No. 5), dioctyl sodium sulfosuccinate (Aerosol OT), alkylated aryl poly ether alcohol (Triton X100), and polyoxyethylene derivative of sorbitan trioleate (Tween 85). Other conventional additaments may be employed provided only that such agent accomplish the end desired and not be reactive with the other ingredients of the composition.

In the preferred method of operation from about 0.03 to 6 parts by weight of the 4-chlorophenyl ester of 4-chlorobenzene sulfonic acid is employed with 1 part by weight of the triethanolamine salt of 2,4-dinitro-6-secondarybutylphenol. In such parasiticidal compositions the toxicants are mutually activating and exert a synergistic effect. In spray compositions, the combining proportions of the toxicants and dosages applied should be so integrated that the content of the 4'-chlorophenyl 4-chlorobenzene sulfonate is from 0.06 to 3 pounds per 100 gallons of spray, and the content of the triethanolamine salt of 2,4-dinitro-6-secondarybutylphenol is from 0.5 to 2.0 pounds per 100 gallons of spray. In concentrates, the mixture of toxicants may constitute from about 10 to 90 per cent by weight of the composition.

It is to be understood that in compositions comprising mixtures of these two toxicants, either component may be present in the composition in excess of the proportion for which the combination of the toxicants is mutually activating. Such a composition constitutes a combination of the synergistic mixture with additional parasiticidal toxicant, and this practice in no way detracts from the improved result obtainable with the preferred proportions of the materials.

The synergistic or greater than additive effect obtainable with these compositions is demonstrated in the following representative operation. 40 parts by weight of 4'-chlorophenyl 4-chlorobenzene sulfonate was mechanically mixed with 1.5 parts of alkyl aryl sulfonate (Nacconal NR), 2 parts of substituted benzoic alkyl sulfonic acids (Daxad No. 27), and 56.5 parts of fuller's earth (Diluex) to form a concentrate identified as "Composition A." 40 parts by weight of the triethanolamine salt of 2,4-dinitro-6-secondarybutylphenol was dissolved in 60 parts of water to form a concentrate hereinafter termed "Composition B."

Composition A in combination with Composition B was employed in aqueous dispersion as a dormant spray mixture. Similarly each of Compositions A and B were employed separately in dormant applications.

The application of the toxicants was made to apple trees of the Red Delicious variety about 4 weeks prior to blooming. The trees were heavily infested with eggs of European red mite and located immediately adjacent to unsprayed check plots which provided a continuous source of reinfestation.

The mixture applied consisted of an aqueous dispersion of 2.5 pounds of Composition A and 1 quart of Composition B per 100 gallons of spray. The application was accomplished with a conventional spray rig and in such dosage as to provide for appreciable run-oil from all three surfaces. Three months after application, the foliage of the trees of the sprayed plots and of check plots was subjected to randomized sampling, and the individual leaves examined to determine the existent mite populations. On the treated trees, a population of only 3 mites per 50 leaves was found. On the check trees, an average population of 1953 mites per 50 leaves was observed.

In a similar operation, Composition A at 5 pounds per 100 gallons of aqueous spray was applied as a dormant application to Red Delicious apple trees. After 3 months, randomized sampling and examination of leaves indicated a mite population of 113 mites per 50 leaves.

Composition B in dormant application was applied in aqueous dispersion as previously described at the rate of 2 quarts per 100 gallons of spray mixture. 3 months following the application, the foliage of the treated trees was found to have an average infestation of 51 mites per 50 leaves.

Incidental to the excellent control of mite infestation attributable to the application of the mixture of toxicants, a 100 per cent control of rosy aphis was accomplished, even though control trees were heavily infested with this organism. The toxicant mixture did not cause tree injury, and the foliage of the trees treated therewith was not subject to the premature leaf and fruit drop from mite attack which characterized the trees in the check plots.

4′-chlorophenyl 4-chlorobenzene sulfonate is a white crystalline solid melting at 81°–83° C. and having the formula

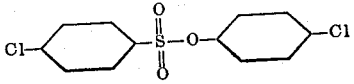

I claim:

1. A miticide composition comprising as active toxic ingredients from 0.03 to 6 parts by weight of the 4-chlorophenyl ester of 4-chlorobenzene sulfonic acid in mixture with 1 part by weight of the triethanolamine salt of 2,4-dinitro-6-secondarybutylphenol, the active toxic ingredients in such composition being mutually activating.

2. A miticide composition comprising a liquid carrier and dispersed therein as active toxic ingredients from 0.03 to 6 parts by weight of the 4-chlorophenyl ester of 4-chlorobenzene sulfonic acid in mixture with 1 part by weight of the triethanolamine salt of 2,4-dinitro-6-secondarybutylphenol, the active toxic ingredients in such composition being mutually activating.

3. A miticide composition comprising an aqueous carrier and dispersed therein as active toxic ingredients (1) the 4-chlorophenyl ester of 4-chlorobenzene sulfonic acid in the amount of from 0.06 to 3 pounds and (2) the triethanolamine salt of 2,4-dinitro-6-secondarybutylphenol in the amount of from 0.5 to 2.0 pounds per 100 gallons of spray, the active toxic ingredients in such composition being mutually activating.

OSCAR H. HAMMER.

REFERENCES CITED

The following references are of record in the file of this patent:

UNITED STATES PATENTS

| Number | Name | Date |
|---|---|---|
| 2,148,928 | De Meuron | Feb. 28, 1939 |
| 2,222,486 | Moore | Nov. 19, 1940 |
| 2,328,505 | Smith et al. | Aug. 31, 1943 |
| 2,392,859 | Meuli | Jan. 15, 1946 |

OTHER REFERENCES

Lauger et al., Helv. Chim. Acta, vol. 27, pages 892 to 908, June 15, 1944, 167–22.

Metcalf, J. Econ. Ent., vol. 41, No. 6, December 1948, pages 875 to 882, 167—DDT.